(12) United States Patent
Röntgen (10) Patent No.: US 12,480,094 B2
(45) Date of Patent: Nov. 25, 2025

(54) IN VITRO MEAT PRODUCTION

(71) Applicant: Forschungsinstitut für Nutztierbiologie, Dummerstorf (DE)

(72) Inventor: Monika Röntgen, Rostock (DE)

(73) Assignee: Forschungsinstitut für Nutztierbiologie, Dummerstorf (DE)

( * ) Notice: Subject to any disclaimer, the term of this patent is extended or adjusted under 35 U.S.C. 154(b) by 580 days.

(21) Appl. No.: 17/798,813

(22) PCT Filed: Oct. 14, 2020

(86) PCT No.: PCT/EP2020/078935
§ 371 (c)(1),
(2) Date: Aug. 10, 2022

(87) PCT Pub. No.: WO2021/160301
PCT Pub. Date: Aug. 19, 2021

(65) Prior Publication Data
US 2023/0146879 A1    May 11, 2023

(30) Foreign Application Priority Data
Feb. 11, 2020   (DE) .......................... 102020201661.5

(51) Int. Cl.
*C12N 5/077* (2010.01)
*A23L 13/00* (2016.01)

(52) U.S. Cl.
CPC ............ *C12N 5/0658* (2013.01); *A23L 13/00* (2016.08); *C12N 2500/32* (2013.01); *C12N 2500/34* (2013.01); *C12N 2500/90* (2013.01); *C12N 2506/02* (2013.01); *C12N 2513/00* (2013.01)

(58) Field of Classification Search
None
See application file for complete search history.

(56) References Cited

U.S. PATENT DOCUMENTS

2012/0213743 A1   8/2012   Buensuceso et al.

FOREIGN PATENT DOCUMENTS

WO   2006041429 A2   4/2006

OTHER PUBLICATIONS

Zhang, et al. Myogenic differentiation of human amniotic mesenchymal cells and its tissue repair capacity on volumetric muscle loss. Journal of Tissue Engineering. 2019(10)1-13. (Year: 2019).*
Patruno, et al. Tat-MyoD fused proteins, together with C2C12 conditioned medium, are able to induce equine adult mesenchymal stem cells towards the myogenic fate. Veterinary Research Communications. 2017(41):211-217. (Year: 2017).*
Brun, et al. Choice of xenogenic-free expansion media significantly influences the myogenic differentiation potential of human bone marrow-derived mesenchymal stromal cells. Cytotherapy. 2016(18):344-359. (Year: 2016).*
Czerner, et al. Determination of Elastic Modulus of Gelatin Gels by Indentation Experiments. 2015(8):287-296. (Year: 2015).*
Soofi, et al. The elastic modulus of Matrigel™ as determined by atomic force microscopy. Journal of Structural Biology. 2009. 167(3):216-219. (Year: 2009).*
Karahuseyinoglu, et al. Biology of Stem Cells in Human Umbilical Cord Stroma: In Situ and In Vitro Surveys. 2007(25):319-331. (Year: 2007).*
Wu, et al. D-Methionine Ameliorates Cisplatin-Induced Muscle Atrophy via Inhibition of Muscle Degradation Pathway. 2018. 18(1):1-15. (Year: 2018).*
Thermo Fisher Scientific Product Information. DMEM. 2016. (Year: 2016).*
Thermo Fisher Scientific Product Information. DMEM/F12. 2016. (Year: 2016).*
International Preliminary Report on Patentability, European Patent Office; International Application No. PCT/EP2020/078935; Aug. 25, 2022; 12 pages.
Written Opinion of the International Searching Authority, European Patent Office; International Application No. PCT/EP2020/078935; Apr. 23, 2021; 12 pages.
AOAC International Official Methods for Analysis, "AOAC Official Method 991.36 Fat (Crude) in Meat and Meat Products, Solvent Extraction (Submersion) Method, First Action 1991, Final Action 1996", 17th Edition, AOAC International, Gaithersburg, MD, 2000.
Arutyunyan et al., "Umbilical Cord as Prospective Source for Mesenchymal Stem Cell-Based Therapy", 2016. Stem Cells Internat vol. 2016, dx.doi.org/10.1155/2016/6901286.
Bostian et al., "Automated Methods for Determination of Fat and Moisture in Meat and Poultry Products: Collaborative Study", (1985), J Assoc Off Anal Chem 68(5):876-880.
Beeravolu et al., "Isolation and comparative analysis of potential stem/progenitor cells from different regions of human umbilical cord", (2016), Stem Cell Res 16: 696-711.
Cardoso et al., "Isolation and characterization of Wharton's jelly-derived multipotent mesenchymal stromal cells obtained from bovine umbilical cord and maintained in a defined serum-free three-dimensional system", (2012), BMC Biotechnology 12:18; www.biomedcentral.com/1472-6750/12/18.

(Continued)

*Primary Examiner* — Allison M Fox
*Assistant Examiner* — Gina Pronzati
(74) *Attorney, Agent, or Firm* — Taft Stettinius & Hollister LLP (57) ABSTRACT

The present invention relates to a method for producing a composition which comprises animal protein, comprising (a) isolating precursor cells from perinatal tissue of a mammal; (b) incubating the precursor cells under conditions which lead to a myogenic differentiation of the precursor cells; and (c) harvesting the cells. The present invention also relates to a method for producing precursor cells from perinatal tissue, to animal protein produced according to the invention, and precursor cells produced according to the invention. The present invention further relates to the use of a culture medium which has a reduced content of methionine in comparison to standard medium, to the differentiation of precursor cells, and to a method for the in vitro production of a meat-like composition.

17 Claims, 6 Drawing Sheets
Specification includes a Sequence Listing.

(56) References Cited

OTHER PUBLICATIONS

Carlin et al., "Expression of earl transcription factors Oct-4, Sox-2 and Nanog by porcine umbilical cord (PUC) matrix cells", 2006. Reprod Biol Endocrinol 4: 8; DOI: 10.1186/1477-7827-4-8.
Conconi, M.T. et al., "CD105(+; cells from Wharton's jelly show in vitro and in vivo myogenic differentiative potential", International Journal of Molecular Medicine 18: pp. 1089-1096, 2006.
Corotchi et al., "Isolation method and xeno-free culture conditions influence multipotent differentiation capacity of human Wharton's jelly-derived mesenchymal stem cells", 2013. Stem Cell Res Ther 4:81; DOI: 10.1186/scrt232.
Hoynowski et al., "Characterization and differentiation of equine umbilical cord-derived matrix cells", 2007. Biochem Biophysic Res Comm 362:347-353; DOI:10.1016/j.bbrc.2007.07.182.
Ishige et al., "Comparison of mesenchymal stem cells derived from arterial, venous, and Wharton's jelly explants of humn umbilical cord", 2009. Int J Hematol 90:261-269.
Kocaefe et al., "Reprogramming of Human Umbilical Cord Stromal Mesenchymal Stem Cells for Myogenic Differentiation and Muscle Repair", 2010. Stem Cell Rev & Rep 6:512-522.
Marcus-Sekura et al., "Evaluation of the human host range of bovine and porcine viruses that may contaminate bovine serum and porcine trypsin used in the manufacture of biological products", 2011. Biologicals 39:359-369.
Moretti et al., "Mesenchymal Stromal Cells Derived from Human Umbilical Cord Tissues: Primitive Cells with Potential for Clinical and Tissue Engineering Applications", 2010, AdvBiochem Engin/ Biotechnol 123: 29-54.
Pham et al., "Isolation and proliferation of umbilical cord tissue derived mesenchymal stem cells for clinical applications", (2016). Cell Tissue Bank 17: 289-302.
Shivakumar et al., "DMSO- and Serum-Free Cryopreservation of Wharton's Jelly Tissue Isolated From Human Umbilical Cord", 2016. J Cell Biochem 117: 2397-2412.
Simonne et al., "Could the Dumas Method Replace the Kjeldahl Digestion for Nitrogen and Crude Protein Determinations in Foods?", (1997), Journal of the Science of Food and Agriculture 73(1):39-45.
Stephens et al., "Bringing cultured meat to market: Technical socio-political, and regulatory challenges in cellular agriculture", 2018. Trends in Food Science & Technology 78: 155-166.
Thorrez et al., "Challenges in the quest for 'clean meat'", 2019. Nat Biotechnol 37: 215-226 . . . .
Wang et al., "Mesenchymal Stem Cells in the Wharton's Jelly of the Human Umbilical Cord", 2004. Stem Cells 22:1330-1337.
Gang, E. J: et al., "Skeletal Myogenic Differentiation of Mesenchymal Stem Cells Isolated from Human Umbilical Cord Blood", Stem Cells 2004, 22, pp. 617-624.
Ben-Arye, T. and Levenberg, S.,"Tissue engineering for Clean Meat Production", Frontiers in Sustainable Food Systems, Jun. 2019, vol. 3, Article 46, pp. 1-19.
Specht, E. et al., "opportunities for applying biomedical production and manufacturing methods to the development of the clean meat industry", Biomedical Engineering Journal 132, 2018, pp. 161-168.
Magali Kitzmann et al: "The Muscle Regulatory Factors MyoD and Myf-5 Undergo Distinct Cell Cycle-specific Expression in Muscle Cells", The Journal of Cell Biology, vol. 142, No. 6, Sep. 21, 1998, pp. 1447-1459; ISSN: 0021-9525, DOI: 10.1083/jcb.142.6.1447.
Mary Latimer et al: "miR-210 expression is associated with methionine-induced differentiation of trout satellite cells", Journal of Experimental Biology, vol. 220, No. 16, Jun. 2, 2017, pp. 2932-2938, ISSN: 0022-0949, DOI: 10.1242/jeb. 154484.
Mrunalini K. Gaydhane et al: "Cultured meat: state of the art and future", Biomanufacturing Reviews, vol. 3, No. 1, Mar. 19, 2018, ISSN: 2363-507X, DOI: 10.1007/s40898-018-0005-1.
Kolkmann A M et al: "Serum-free media for the growth of primary bovine myoblasts", Cytotechnology, Kluwer Academic Publishers, Dordrecht, NL, vol. 72, No. 1, Dec. 28, 2019, ISSN: 0920-9069, DOI: 10.1007/S10616-019-00361-Y.
Markert C D et al: "Mesenchymal Stem Cells: Emerging Therapy for Duchenne Muscular Dystrophy", PM&R, Elsevier, Amsterdam, NL, vol. 1, No. 6, Jun. 1, 2009, pp. 547-559, ISSN: 1934-1482.
Swierczek Barbara et al: "From pluripotency to myogenesis: a multistep process in the dish", Journal of Muscle Research and Cell Motility, Chapman, London, GB, vol. 36, No. 6, Dec. 29, 2015, ISSN: 0142-4319, DOI: 10.1007/S10974-015-9436-Y.
Kuang et al: "The emerging biology of satellite cells and their therapeutic potential", Trends in Molecular Medicine, Elsevier Current Trends, GB, vol. 14, No. 2, Jan. 22, 2008, pp. 82-91, ISSN: 1471-4914, DOI: 10.1016/J.Molmed.2007.12.004.
International Search Report; European Patent Office; International Application No. PCT/EP2020/078935; Apr. 23, 2021; 15 pages.

* cited by examiner

SEQUENCE LISTING

<160> NUMBER OF SEQ ID NOS: 16

<210> SEQ ID NO 1
<211> LENGTH: 20
<212> TYPE: DNA
<213> ORGANISM: Sus scrofa

<400> SEQUENCE: 1
cgtggcgcga ctttctacca          20

<210> SEQ ID NO 2
<211> LENGTH: 20
<212> TYPE: DNA
<213> ORGANISM: Sus scrofa

<400> SEQUENCE: 2
ccagggccat ggcatcgtaa          20

<210> SEQ ID NO 3

-continued

```
<211> LENGTH: 24
<212> TYPE: DNA
<213> ORGANISM: Sus scrofa

<400> SEQUENCE: 3
tcgctctctt gctaacagtc ttgc                                          24

<210> SEQ ID NO 4
<211> LENGTH: 21
<212> TYPE: DNA
<213> ORGANISM: Sus scrofa

<400> SEQUENCE: 4
ctgaatgggc aggttggtgg t                                             21

<210> SEQ ID NO 5
<211> LENGTH: 20
<212> TYPE: DNA
<213> ORGANISM: Sus scrofa

<400> SEQUENCE: 5
tcagcaacga ggtggtcgtc                                               20

<210> SEQ ID NO 6
<211> LENGTH: 20
<212> TYPE: DNA
<213> ORGANISM: Sus scrofa

<400> SEQUENCE: 6
ccacgtcagg ccccagattc                                               20

<210> SEQ ID NO 7
<211> LENGTH: 22
<212> TYPE: DNA
<213> ORGANISM: Sus scrofa

<400> SEQUENCE: 7
tcgacaccga gactgtctct cc                                            22

<210> SEQ ID NO 8
<211> LENGTH: 20
<212> TYPE: DNA
<213> ORGANISM: Sus scrofa

<400> SEQUENCE: 8
acagagctgg gtctgcgaga                                               20

<210> SEQ ID NO 9
<211> LENGTH: 20
<212> TYPE: DNA
<213> ORGANISM: Sus scrofa

<400> SEQUENCE: 9
cccgccctat gacttctgcg                                               20

<210> SEQ ID NO 10
<211> LENGTH: 20
<212> TYPE: DNA
<213> ORGANISM: Sus scrofa

<400> SEQUENCE: 10
ctgggactcc tcggggttcg                                               20
```

```
<210> SEQ ID NO 11
<211> LENGTH: 20
<212> TYPE: DNA
<213> ORGANISM: Sus scrofa

<400> SEQUENCE: 11
cagtggtcaa gtccgaggcg                                                   20

<210> SEQ ID NO 12
<211> LENGTH: 20
<212> TYPE: DNA
<213> ORGANISM: Sus scrofa

<400> SEQUENCE: 12
tgtaccgttg atggccgtgc                                                   20

<210> SEQ ID NO 13
<211> LENGTH: 20
<212> TYPE: DNA
<213> ORGANISM: Sus scrofa

<400> SEQUENCE: 13
tgccaaatag acgacgaaga                                                   20

<210> SEQ ID NO 14
<211> LENGTH: 21
<212> TYPE: DNA
<213> ORGANISM: Sus scrofa

<400> SEQUENCE: 14
acgacacatt acggagtctg a                                                 21

<210> SEQ ID NO 15
<211> LENGTH: 21
<212> TYPE: DNA
<213> ORGANISM: Sus scrofa

<400> SEQUENCE: 15
tgaaacctca ctgcctgctg c                                                 21

<210> SEQ ID NO 16
<211> LENGTH: 22
<212> TYPE: DNA
<213> ORGANISM: Sus scrofa

<400> SEQUENCE: 16
agggtcttcg cccagccttt ct                                                22
```

IN VITRO MEAT PRODUCTION

CROSS-REFERENCE TO RELATED APPLICATIONS

This application is a U.S. National Phase of International PCT Application No. PCT/EP2020/078935 filed on Oct. 14, 2020, which claims priority to German Patent Application No. 102020201661.5 filed on Feb. 11, 2020, the contents of each application are incorporated herein by reference in their entireties.

The present invention relates to a method for producing a composition which comprises animal protein, comprising (a) isolating precursor cells from perinatal tissue of a mammal; (b) incubating the precursor cells under conditions which lead to a myogenic differentiation of the precursor cells; and (c) harvesting the cells. The present invention also relates to a method for producing precursor cells from perinatal tissue, to animal protein produced according to the invention, and precursor cells produced according to the invention. The present invention further relates to the use of a culture medium which has a reduced content of methionine in comparison to standard medium, to the differentiation of precursor cells, and to a method for the in vitro production of a meat-like composition.

By 2050, the world population will increase to about 10 billion. One of the most important challenges in this connection is to ensure nutrition on the global scale and in particular, the supply of high grade protein. In this, the conventional production of meat with agricultural livestock plays an important part; it has already tripled in the last 50 years. Since in spite of the rising demand adverse effects on the environment and the climate have to be avoided and a sustainable meat production requires the reduction of animal numbers, alternative forms of production must be found. One option is so-called "in vitro meat", which is regarded as an environment and resource-saving alternative to meat (Stephens et al., 2018; Thorrez & Vandenburgh, 2019).

Although the fundamental method for producing meat from animal cells (cattle, chicken, seafood) is known, it is so far only produced on the laboratory scale, i.e. in small quantities, and is therefore still very cost-intensive. To date, for the obtention of the source cells, muscle tissue from slaughtered animals has mostly been used, or muscle biopsies are performed on living animals, so that there are ethical problems in addition. The cells obtained are adult stem cells, so-called satellite cells, the growth and differentiation capability whereof are already markedly restricted. Furthermore, they display a high degree of heterogeneity and, depending on the donor animal, the cell quality is subject to major fluctuations, which are due, for example, to differences in age and genetics and result from environmental influences.

Alternatively, the company "Meatable" mainly uses hematopoietic stem cells from cattle, which are obtained from umbilical cord blood. However, hematopoietic stem cells must be genetically manipulated (reprogramed) in order to be able to form muscle and fat cells.

The isolation of cells from umbilical cord tissue has been described for various species, most frequently for humans (Ishige et al., 2009; Corotchi et al., 2013), but also for ruminants (e.g. Cardoso et al., 2012) and horse (Hoynowski et al., 2007). The isolation of mesenchymal stem cells (MSC) from the umbilical cord matrix of the pig was described by Carlin et al. (Carlin et al., 2006).

In principle, mesenchymal stem cells (MSC) can be obtained by growing the cells out from tissue explants or by enzymatic digestion of the tissue (Moretti et al., 2010). For the enzymatic digestion, inter alia collagenases, trypsin, dispase and hyaluronidase are used, which derive from animal materials and hence, entail a risk of contamination (Marcus-Sekura et al., 2011). Furthermore, it has been proven that the efficiency of the isolation (yield of viable cells) is better with use of the explant method, since cell damage is avoided (e.g. Arutyunyan et al., 2016).

Since MSC from umbilical cord tissue (UC-MSC) already migrate into the umbilical cord in an early phase of embryogenesis, they are characterized by a unique mixture of the properties of prenatal (embryonic) and postnatal (adult) stem cells (Wang et al., 2004; Arutyunyan et al., 2016). UC-MSC have, for example, high biosafety, since they have no inflammatory or tumorigenic potential. A further advantage of UC-MSC is their high and long-lasting in vitro proliferation rate (short doubling time: 21-45 hrs, 7 to about 25 serial passages with >300-fold increase in cell count) with stable stem cell phenotype, since for the production of cell-based meat the production of large, homogeneous quantities of cells with maintenance of the stem cell properties (Moretti et al., 2010; Pham et al., 2016; Arutyunyan et al., 2016) is a decisive requirement. The favorable properties of UC-MSC in this regard, result inter alia from the fact that they still express marker proteins of embryonic SC (e.g. Okt4, SOX2, Nanog) (Beeravolu et al., 2016; Pham et al., 2016), which inhibit differentiation. Further, under differentiating conditions, they can form a multitude of cell types, such as fat cells, muscle cells, cartilage cells, bone cells, bone marrow stromal cells, but also nerve cells, vascular wall cells, heart muscle cells, liver-like cells and 13 cells of the pancreas (Ishige et al., 2009; Wang et al., 2011; Corotchi, 2013; Pham et al., 2016; Shivakumar et al., 2016). Also to be regarded as favorable is that UC-MSC derive from neonates and hence, have not yet been altered by ageing and environmental influences.

The conversion of the UC-MSC into myogenic cells and the formation of muscle fibers, respectively, is the key step on the path to the production of cell-based meat. However, the differentiation of UC-MSC in muscle cells has been little investigated so far. As a possibility for inducing myogenic differentiation, culturing in myogenic medium, with serum withdrawal and addition of 5-azacytidine (Conconi et al., 2006) has been described; alternatively, cells have been transfected with myogenic genes (MyoD: Kocaefe et al., 2010). The differentiation of MSC into muscle cells was thus, performed chemically or by genetic manipulation to date. In adult muscle stem cells, the induction is achieved by the withdrawal or the reduction of fetal bovine calf serum (FBS), an essential component of cell culture media.

In spite of the existing knowledge, there is a high demand for improved means and methods for in vitro production of meat-like products, especially on a large scale. This problem is solved by the subject matter of the independent claims, optionally supplemented by the features of the dependent claims and the present specification.

Consequently, the present invention relates to a method for producing a composition which comprises animal protein, comprising:
(a) isolating precursor cells from perinatal tissue of an agricultural animal, preferably from the family Suidae;
(b) incubating the precursor cells under conditions which lead to a myogenic differentiation of the precursor cells; and
(c) harvesting the cells.

In the context of the present specification, the terms "contain", "comprise" or "include" and any grammatical variations thereof are used in non-exclusive meaning. These terms can thus, on the one hand relate to a situation in which, in addition to the features which are introduced by the terms, no further features are present in the subject matter described, but also to a situation in which one or several further features are present. Thus, for example the expressions "A comprises B", "A contains B" and "A includes B" can both refer to a situation in which apart from B no further element is present in A (namely a situation in which A consists exclusively of B), but also to a situation in which, in addition to B one or several further elements are present in A, such as element C, element C and D or even further elements. Accordingly, the expressions "comprising one" and "containing one" preferably relate to "comprising one or several", i.e. are equivalent to "comprising at least one".

Furthermore, hereafter the terms "preferably", "more preferably", "even more preferably", "most preferably", "in particular", "specifically" or similar terms are used in connection with optional features, without excluding further possibilities. Features which are introduced by these terms are thus to be understood as optional features, and in no way restrict the scope of the claims. As the skilled person will understand, the invention can be performed with use of alternative features. In the same way, features which are introduced by an expression such as "in one embodiment" or similar wordings are to be understood as optional features, without restricting the possibility of the development of further embodiments, without restricting the invention and without narrowing the possibility of making available further combinations of features with other optional or non-optional features.

Unless otherwise stated, the term "standard conditions" refers to IUPAC Standard Ambient Temperature and Pressure (SATP) conditions, i.e. preferably to a temperature of 25° C. and an absolute pressure of 100 kilopascals; likewise preferably standard conditions additionally comprise a pH of 7. Unless otherwise stated, the term "approximately" refers to the stated value with the generally accepted technical precision in the relevant technical field, preferably the term refers to the stated value±20%, preferably ±10%, more preferably ±5%. Furthermore, the term "essentially" refers to the fact that there are no deviations which have an influence on the stated result; that is to say, possible perturbations lead to a deviation of not more than ±20%, preferably ±10%, more preferably ±5% from the stated value. The term "essentially consisting of" therefore refers to the stated components with exclusion of other components, except for components which are present as impurities, of components which are as unavoidable components a result of the production process and of components which were added for a purpose different from the technical effect of the invention. For example, a composition which is described as "essentially consisting of" can additionally contain usual additives, excipients, diluents, carrier substances or the like. Preferably, a composition which essentially consists of a set of components comprises less than 5% (w/w), preferably less than 3% (w/w), more preferably less than 1% (w/w), and even more preferably less than 0.1% (w/w) of non-specified components.

The method for producing a composition which comprises animal protein is an in vitro process. The method according to the invention can comprise additional steps to those expressly mentioned; for example, further steps can relate to the provision of perinatal tissue or to further incubation and/or growth steps with the myogenically differentiated precursor cells obtained, e.g. comprising one or several steps of the growth of the precursor cells and/or of the myogenically differentiated precursor cells obtained, and/or comprising a step of the three-dimensional structuring of the cells and preferably further growth. One or several of said steps can also be performed in an automated manner.

In the context of the present invention, the term "animal" describes a heterotrophic representative of the domain Eukarya, which forms an organism which contains muscle cells. Preferably the animal is a mammal, more preferably an agricultural animal or a human. The term "agricultural animal" is thus used herein exclusively for agricultural animals which are mammals. More preferably, the agricultural animal is a member of the family Suidae, even more preferably a representative of the genus *Sus*, most preferably a member of the species *Sus scrofa*. In the context of applications of the food industry, the animal is non-human, preferably an agricultural animal as described above, most preferably a pig; in the context of applications of pharmacy, the animal is preferably an agricultural animal, in particular a bovine, a pig, a horse, a sheep or a goat, or a companion animal, in particular a cat or a dog. More preferably in the context of applications of pharmacy, the animal is a human.

The term "animal protein" is used herein for any protein of animal origin. The animal protein is therefore at least one polypeptide, the amino acid sequence whereof corresponds to the amino acid sequence of a protein of at least one animal, preferably is essentially identical therewith. The term "protein" is herein used in accordance with the normal use of the term both for a single polypeptide species, and also for a mixture of several, preferably many, different polypeptide species. The animal protein thus preferably comprises a mixture of different polypeptide species. Preferably the animal protein is contained in an animal cell and/or has been produced from an animal cell.

The term "composition" is used herein for any preparation which contains the stated component(s). The term "composition which comprises animal protein" thus comprises all preparations which contain animal protein, regardless of the presence and/or the content of further components, and regardless of the protein and/or water content of the composition. Preferably the composition comprises at least 5% (w/w), more preferably at least 10% (w/w), even more preferably at least 25% (w/w) protein. Likewise preferably, the composition comprises at least 1% (w/w) lipids, more preferably at least 5% (w/w) lipids. Preferably the composition comprises 1% (w/w) to 25% (w/w) lipids, more preferably 5% (w/w) to 15% (w/w) lipids. Methods for determination of the protein and fat content are known to the skilled person from general textbooks, e.g. AOAC International Official Methods for Analysis 17th Edition, AOAC International, Gaithersburg, MD, 2000; preferred are the Kjeldahl method for protein determination (Simonne et al., (1997), Journal of the Science of Food and Agriculture 73(1): 39-45) and the method according to Soxhlet for determination of fat content (Bastian et al. (1985), J Assoc Off Anal Chem 68(5): 876-880). Preferably, the composition comprises animal cells, preferably animal muscle cells; more preferably the composition essentially consists of animal cells, preferably of animal muscle cells. Preferably the composition comprises muscle fibers, thus the composition is preferably a meat-like composition, preferably with meat-like texture; accordingly, the composition preferably has a water content from 40% (w/w) to 75% (w/w), preferably from 50% (w/w) to 65% (w/w). However, the composition can also be a dried composition with a water content below 10% (w/w), preferably below 5% (w/w).

Herein, the term "precursor cells" describes cells which have the ability to differentiate into myocytes or myocyte-like cells. Preferably, the precursor cells produce no desmin, no F-actin, no MyoD, no MyoG and/or no myosin; accordingly, precursor cells are preferably not myocytes or myocyte-like cells. Preferably, the precursor cells express at least one marker selected from CD73, CD90, CD105, Oct4, Nanog and Sox2. Preferably, the precursor cells are multipotent precursor cells, more preferably mesenchymal stem cells, even more preferably perinatal mesenchymal stem cells. Preferably, the precursor cells can differentiate at least into myocytes and adipocytes.

Herein, the term "perinatal tissue" is used for all tissues which are at least partially formed from the fetus of a mammal, but are not parts of the actual fetus. In particular, the term describes all tissues or organs which are part of the afterbirth of a mammal, thus in particular umbilical cord, placenta and/or fetal membrane. Preferably, the perinatal tissue is the umbilical cord of a mammal or a part thereof. Perinatal tissue is preferably obtained non-invasively in the context of the birth, preferably after elimination of the perinatal tissue from the maternal body. The term "growth of precursor cells" is used herein in the usual meaning, familiar to the skilled person. The term thus preferably relates to the incubation of precursor cells under conditions which allow cell division of at least one part of the precursor cells and thus, preferably lead to an increase in the total number of the precursor cells. Preferably, the growth of the precursor cells comprises introduction of the precursor cells into a culture medium, preferably into a culture medium which is free from serum of an agricultural animal, even more preferably in a culture medium which is free from serum of a mammal, most preferably in a serum-free culture medium. The culture medium preferably comprises a proportion of conditioned culture medium, preferably one of the serum-free culture media described above. The content of conditioned medium is preferably 5% (v/v) to 50% (v/v), more preferably 10% (v/v) to 40 (v/v), even more preferably 15% (v/v) to 30% (v/v), most preferably approximately 20% (v/v) of the total volume of the medium. Herein, the term "conditioned medium" preferably relates to a medium which has been obtained by incubating precursor cells, preferably from passages 1 or 2 after isolation, in the medium for at least one, more preferably at least two, even more preferably at least three day(s). Also preferably, the serum-free medium can comprise components which were obtained from the aforesaid conditioned medium. Preferred serum-free media are described herein in the Examples.

The term "myogenic differentiation" is in principle known to the skilled person. In the context of the present invention, the term describes the development of precursor cells into myocytes or myocyte-like cells, in a preferred embodiment to muscle fibers. This development can be verified by determination of a decrease in the expression of markers of precursor cells, in particular of those described elsewhere herein, and/or preferably by determination of an increase in the expression of myocyte markers, in particular desmin, F-actin, MyoD, MyoG and/or myosin. Appropriate methods are known to the skilled person and are shown in the Examples.

Conditions which induce a myogenic differentiation of precursor cells are in principle known to the skilled person. Thus, precursor cells can be genetically or chemically manipulated such that they undergo a myogenic differentiation, e.g. by overexpression of the factor MyoD, lowering of the serum content of the culture medium from 10 to 20% to at most 2%, and/or by incubation in a medium which contains 5-azacytosine. Preferably, conditions which lead to a myogenic differentiation of precursor cells comprise an incubation in a preferably serum-free culture medium, which in comparison to standard medium (preferably Dulbecco's modified Eagle medium; DMEM: 30 mg/l methionine, corresponding to 200 µM methionine) has a reduced content of methionine, preferably at most in a concentration of 5 µM, more preferably at most 4 µM, even more preferably at most 3 µM, even more preferably at most 2.5 µM. Most preferably, conditions which lead to a myogenic differentiation of precursor cells comprise incubation in a culture medium without added methionine. In a preferred embodiment, conditions which lead to a myogenic differentiation of precursor cells thus comprise incubation in a preferably serum-free culture medium which contains no methionine (i.e. a concentration of 0 µM methionine as free amino acid).

Preferably, during the myogenic differentiation contact of the precursor cells with a solid surface is avoided; in particular, attachment of the precursor cells to a solid or semi-solid substrate is avoided. Also preferably, during the differentiation assembly of the cells is promoted in order to promote the formation of a 3D structure. Preferably therefore, the precursor cells are incubated in a hanging drop; appropriate methods are known to the skilled person.

In the experiments on which the present invention is based, it was surprisingly found that precursor cells which can undergo myogenic differentiation, can be isolated from perinatal tissues. It was surprisingly found that such a differentiation can advantageously be induced by incubation in a medium with reduced methionine content. Moreover, it was surprisingly established that all steps from the isolation of the precursor cells from their growth to the formation of differentiated cells can be performed in serum-free medium and require no genetic manipulation of the cells.

The above definitions apply mutatis mutandis for what follows. Additional definitions which are used in the following likewise apply mutatis mutandis for all embodiments described herein.

The present invention also relates to a method for producing precursor cells, comprising:
  (A) providing at least one perinatal tissue, preferably an umbilical cord, of a mammal;
  (B) chopping the perinatal tissue, so that pieces thereof are obtained;
  (C) incubating the pieces of the perinatal tissue in a culture medium;
  (D) whereby precursor cells are obtained.

The method for producing precursor cells is an in vitro method. The method can comprise additional steps to those expressly mentioned; for example, further steps can relate to a purification and/or disinfection of the perinatal tissue before step (B). One or several of said steps can also be performed in an automated manner.

The step of the chopping of the perinatal tissue preferably comprises cutting of the tissue into pieces. Preferably, tissue pieces of volume from 1 $mm^3$ to 500 $mm^3$, preferably 2 $mm^3$ to 100 $mm^3$ are thereby produced. The tissue pieces are preferably introduced into an incubation device with at least one solid surface, preferably a vessel with a plastic surface, e.g. a Petri dish. Preferably, cells and/or tissues which adhere to said solid surface during the incubation are used as the basis for the isolation of precursor cells. The medium which is used for the incubation of the perinatal tissue is preferably serum-free.

The present invention further relates to use of precursor cells which have been produced by the method according to the invention for the production of muscle tissue cells, fat tissue cells and/or connective tissue cells.

The present invention also relates to a method for the myogenic differentiation of precursor cells, comprising incubation of the precursor cells in a culture medium which in comparison to standard medium has a reduced content of methionine or is methionine-free.

The method for myogenic differentiation from precursor cells is an in vitro process. The method can comprise additional steps to those expressly mentioned; for example, further steps can relate to a preparation of precursor cells and/or use of the myogenically differentiated cells obtained. One or several of said steps can also be performed in an automated manner.

The present invention also relates to animal protein produced or producible with the method according to the invention for producing a composition which comprises animal protein and/or by using precursor cells produced or differentiated by a method according to the invention.

The present invention also relates to use of a culture medium which in comparison to standard medium has a reduced content of methionine, for the differentiation of precursor cells, preferably of myogenic precursor cells. As stated above, the culture medium preferably comprises methionine in a concentration of 5 µM, more preferably at most 4 µM, even more preferably at most 3 µM, even more preferably at most 2.5 µM. Most preferably, the culture medium comprises no added methionine. Likewise, the culture medium is a serum-free culture medium.

The present invention also relates to precursor cells, which have been produced and/or differentiated by the method according to the invention, for producing precursor cells, for use in medicine, preferably for muscle regeneration.

The present invention likewise relates to a method for producing a meat-like composition, comprising
I) myogenic differentiation of precursor cells according to the method according to the invention for the myogenic differentiation of precursor cells;
II) three-dimensional structuring of the differentiated precursor cells obtained in step I), in particular by use of incubation in the "hanging drop" or similar processes, and
III) growth of the three-dimensional structure obtained in step II).

The method for producing a meat-like composition is an in vitro process. The method can comprise additional steps to those expressly mentioned; for example further steps can relate to the provision of precursor cells, preferably according to the method according to the invention for producing precursor cells, or to a further processing of the meat-like composition. One or several of said steps can also be performed in an automated manner.

The term "meat-like composition" is used in the broad sense for compositions which in composition, texture and/or taste are similar to animal meat and which are usable for the application as meat substitute in at least one application in the food industry or pharmacy. Preferred applications in the food industry are sausage production and production of minced meat, in particular burger patties. A preferred application in pharmacy is muscle regeneration.

The term "three-dimensional structuring" is familiar to the skilled person. Preferably, myogenically differentiated precursor cells and/or microtissue produced therefrom are spatially structured, preferably embedded in a solid or preferably semi-solid matrix. Suitable matrix materials are known to the skilled person; preferred are biocompatible matrix materials, in particular protein-containing matrices such as gelatins and fibrins, and polysaccharide-containing matrices such as alginates, chitosans, hyaluronates and agar-agar. The three-dimensional arrangement can be obtained with known processes, e.g. blending of myogenically differentiated precursor cells, preferably aggregates thereof, into liquefied matrix material, molding of the mixture into the desired shape and subsequent solidification of the matrix. Alternatively or additionally, myogenically differentiated precursor cells can be applied or introduced onto and/or into a solid matrix, wherein the solid matrix is preferably porous. The three-dimensional arrangement is preferably produced by 3D printing of a mixture of myogenically differentiated precursor cells or myogenically differentiated microtissues and a suitable matrix material ("bio-printing").

Preferably, adipogenically differentiated cells/microtissues are also incorporated into the three-dimensional structuring, wherein the term "adipogenically differentiated" refers to cells which are adipocytes or adipocyte-like cells. Adipocytes and adipocyte-like cells can be identified by the formation of intracellular fat droplets, as described in the embodiments. Methods for adipogenic differentiation of cells are known to the skilled person and are described in the embodiments. Preferably, the adipogenically differentiated cells are produced from the precursor cells of the present invention.

In the light of the foregoing, the following embodiments are especially taken into consideration:

Claims/Embodiments

Embodiment 1. A method for producing a composition which comprises animal protein, comprising
(a) isolating precursor cells from perinatal tissue of an agricultural animal, preferably from the family Suidae;
(b) incubating the precursor cells under conditions which lead to a myogenic differentiation of the precursor cells; and
(c) harvesting the cells.

Embodiment 2. The method according to embodiment 1, wherein the animal is a representative of the genus *Sus*, preferably a representative of the species *Sus scrofa*.

Embodiment 3. The method according to embodiment 1 or 2, wherein the perinatal tissue is umbilical cord tissue, preferably the umbilical cord of a piglet.

Embodiment 4. The method according to any one of embodiments 1 to 3, wherein the precursor cells are multipotent precursor cells, preferably mesenchymal stem cells, more preferably perinatal mesenchymal stem cells.

Embodiment 5. The method according to anyone of embodiments 1 to 4, wherein the method comprises a co-culture of the precursor cells with adipogenically differentiated precursor cells.

Embodiment 6. The method according to any one of embodiments 1 to 5, wherein the incubation of the precursor cells comprises introduction of the precursor cells into a culture medium.

Embodiment 7. The method according to embodiment 6, wherein the culture is a serum-free culture medium, which preferably comprises a proportion of conditioned serum-free medium.

Embodiment 8. The method according to any one of embodiments 1 to 7, wherein the conditions which lead to a myogenic differentiation comprise incubation in a culture medium which in comparison to the standard medium has a reduced content of methionine or is methionine-free.

Embodiment 9. The method according to anyone of embodiments 1 to 8, wherein the conditions which lead to a myogenic differentiation comprise incubation in a culture medium which comprises methionine at most in a concentration of 5 µM, preferably at most 4 µM, more preferably at most 3 µM, most preferably at most 2.5 µM.

Embodiment 10. The method according to any one of embodiments 1 to 9, wherein the conditions which lead to a myogenic differentiation comprise incubation in a culture medium without added methionine.

Embodiment 11. The method according to anyone of embodiments 1 to 10, wherein during the myogenic differentiation contact of the precursor cells with a solid surface is avoided, whereby preferably microtissues are produced from myogenically differentiated precursor cells.

Embodiment 12. The method according to any one of embodiments 1 to 11, wherein the conditions which lead to a myogenic differentiation comprise incubation in a hanging drop.

Embodiment 13. A method for producing precursor cells, comprising:
(A) providing at least one perinatal tissue, preferably an umbilical cord, of a mammal;
(B) comminuting the perinatal tissue, so that pieces thereof are obtained;
(C) incubating the pieces of the perinatal tissue in a culture medium;
(D) whereby precursor cells are obtained.

Embodiment 14. The method according to embodiment 13, wherein the culture medium in step (C) is a serum-free medium.

Embodiment 15. Use of precursor cells which have been produced by the method according to embodiment 13 or 14, for producing muscle tissue cells, fat tissue cells and/or connective tissue cells.

Embodiment 16. A method for the myogenic differentiation of precursor cells, comprising incubating the precursor cells in a culture medium which in comparison to the standard medium has a reduced content of methionine.

Embodiment 17. The method according to embodiment 16, wherein the culture medium is a serum-free culture medium.

Embodiment 18. The method according to embodiment 16 or 17, wherein the culture medium contains methionine at most in a concentration of 5 µM, preferably at most 4 µM, more preferably at most 3 µM, most preferably at most 2.5 µM.

Embodiment 19. The method according to anyone of embodiments 16 to 18, wherein the culture medium contains no added methionine.

Embodiment 20. The method according to any one of embodiments 16 to 19, wherein the precursor cells are multipotent precursor cells, preferably mesenchymal stem cells, more preferably perinatal mesenchymal stem cells.

Embodiment 21. The method according to anyone of embodiments 16 to 20, wherein the precursor cells are precursor cells which were obtained by the method according to embodiment 13 or 14.

Embodiment 22. The method according to any one of embodiments 16 to 21, wherein during the myogenic differentiation contact of the precursor cells with a solid surface is avoided.

Embodiment 23. The method according to anyone of embodiments 16 to 22, wherein the incubation takes place in a hanging drop.

Embodiment 24. An animal protein, produced or producible with the method according to anyone of embodiments 1 to 12 and/or with use of precursor cells/microtissues produced or differentiated according to a method according to anyone of embodiments 13 to 23.

Embodiment 25. Use of a culture medium which in comparison to the standard medium has a reduced content of methionine for the differentiation of precursor cells, preferably of myogenic precursor cells.

Embodiment 26. Precursor cells which have been produced or differentiated according to a method according to anyone of embodiments 13 to 23, for use in medicine, preferably for muscle regeneration.

Embodiment 27. A method for producing a meat-like composition, comprising
I) myogenic differentiation of precursor cells according to the method according to the invention for the myogenic differentiation of precursor cells;
II) three-dimensional structuring of the differentiated precursor cells obtained in step I), and
III) growth of the cells in the three-dimensional structure obtained in step II).

Embodiment 28. The method according to embodiment 27, wherein the three-dimensional structuring in step c) is obtained by 3D printing.

Embodiment 29. The method according to embodiment 27 or 28, wherein adipogenically differentiated cells are incorporated in the three-dimensional structuring as described in step c).

All citations in this specification are hereby by reference incorporated into the specification, this with regard to their entire disclosure content and the disclosure content as it is cited herein.

EXAMPLE 1: OBTENTION OF UMBILICAL CORDS

Umbilical cords from pigs were only removed after completion of the natural cord separation process from the mother. For this, after cleaning and disinfection with 70% ethanol, the umbilical cords were tied off or clamped off about 2 cm from the navel and severed with sharp scissors. The umbilical cords were then multiply rinsed with sterile, ice-cooled Dulbecco's phosphate buffered saline with 1% penicillin and 1% amphotericin B (DPBS rinse solution), until blood residues had been removed and the tissue appeared white and clean. Then the umbilical cords were stored on ice in fresh DBPS rinse solution for transport and until further use.

Explant cultures were prepared in the sterile laboratory. Fresh umbilical cords were decontaminated in 3 steps after transfer into the sterile area, and thereafter constantly kept moist with DPBS rinse solution.

Decontamination of the Umbilical Cord:
- rinse umbilical cord several times (3-5 times) with DPBS rinse solution
- submerge umbilical cord in 70% EtOH (max. 1 min, to avoid tissue damage)
- rinse umbilical cord several times (3-5 times) with DPBS rinse solution

Example 2: Preparation of Explant Cultures

For the preparation of the explant cultures, pieces of the umbilical cord were placed in a small Petri dish with DPBS rinse solution and then cut up longitudinally and folded back; the tissue was cut into ca. 4×4 mm pieces or stamped out with a tissue cutter. In each case, 20 segments were placed in a 10 cm CellCoat dish.

Next 10 ml of culture medium were added to each explant culture (culture dish), and these then incubated at 37° C., 5% $CO_2$ in the incubator. Modifications of the process (e.g. removal of the umbilical cord vasculature, isolation of Wharton's jelly) brought no significant improvement of the result.

Example 3: Testing of the Effect of Serum in the Explant Medium

Explant experiments were performed with standard culture medium (DMEM low glucose with 10% FCS, 1% PenStrep, 1% amphotericin) or with commercially obtainable special medium for mesenchymal stem cells (MesenCult ACF Plus, 1% PenStrep, 1% amphotericin, 2 mM L-glutamine, 1×ACF supplement (MC Stemcell Technologies, Cologne; with attachment factor: *05448)). MesenCult ACF Plus contains no animal additives or xenobiotics.

Figure 1:
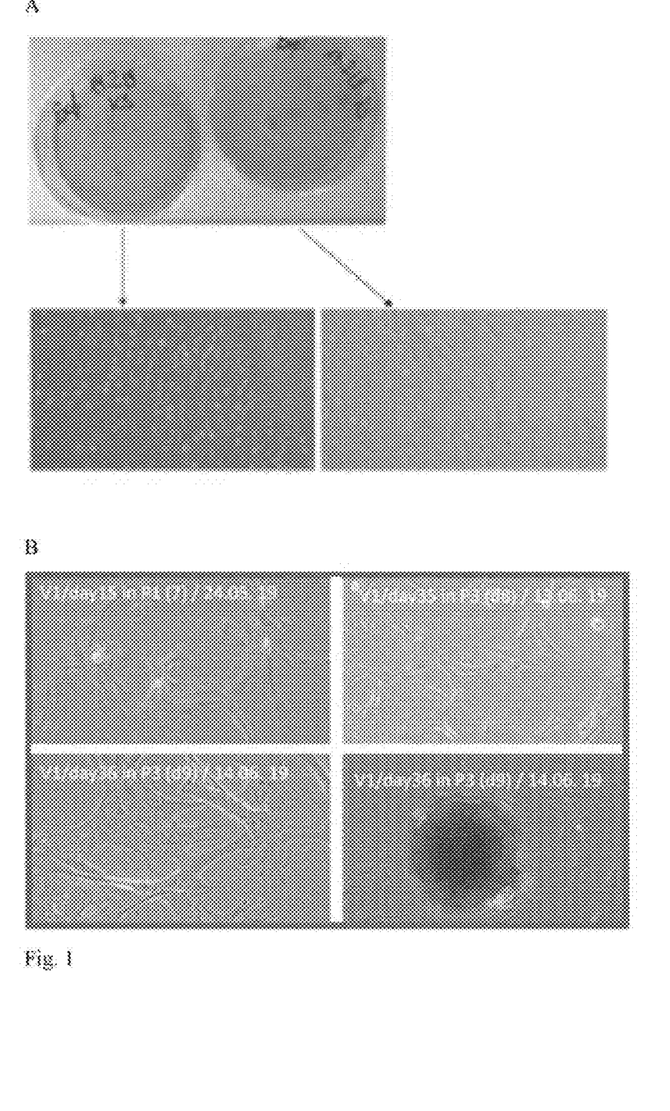
FIG. 1: Explant culture of mesenchymal stem cells from umbilical cord tissue from the pig: explant culture (A); typical change in morphology over time (B).

With all batches and independently of the nature of the medium used, after 4-5 days migrated cells (umbilical cord mesenchymal stem cells, UC-MSC) were clearly visibly present (FIG. 1); after 6 to 8 days the tissue pieces were removed and a first medium change performed. It could be shown that the presence of FCS exerts no influence on the establishment of the parent cell bank.

Example 4: Determination of the Identity of the Uc-Msc

The UC-MSC identity was determined through the presence of various surface markers (Arutyunyan et al., 2016). The marker expression of MSC is heterogeneous, however CD73 (Wang et al., 2004; Corotchi, 2013), CD90 (Corotchi, 2013) and CD105 (Wang et al., 2004; Corotchi, 2013), which are said to be present in 98% of the cells, are particularly characteristic.

Figure 2:
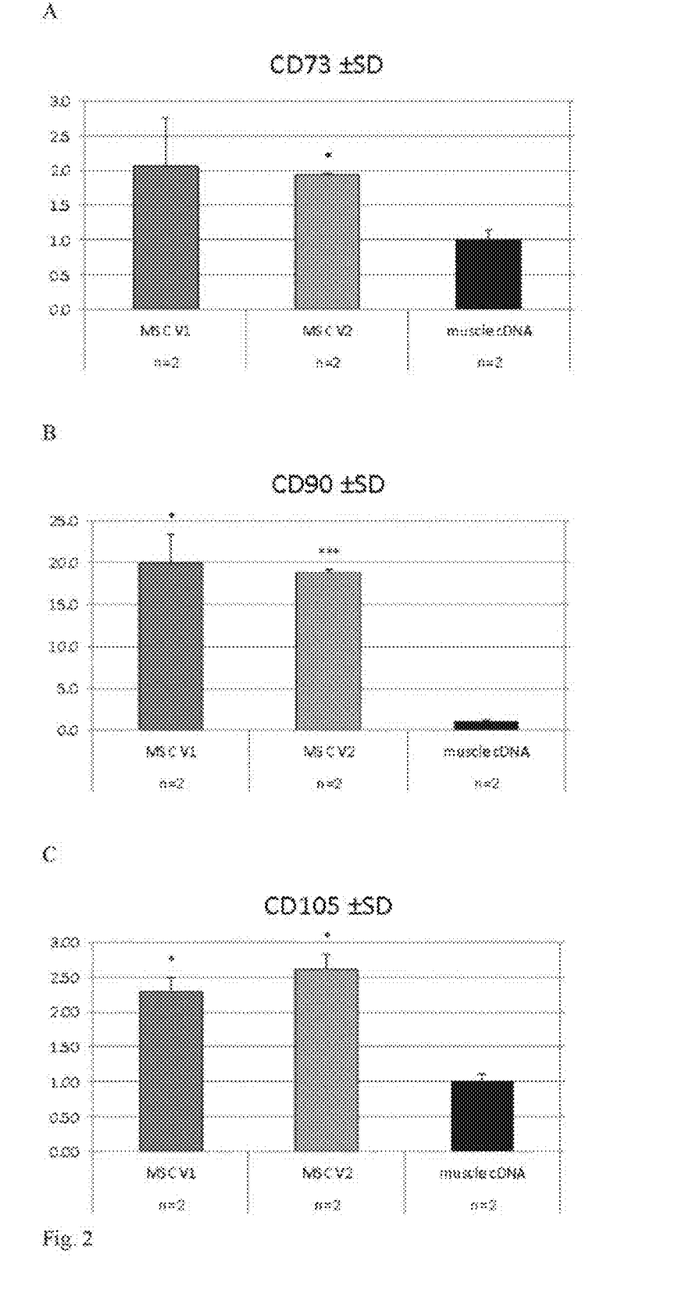
FIG. 2: Expression of markers by UC-MSC, detection via qRT-PCR; (A) CD73, (B) CD90, (C) CD105; as negative control, muscle cell cDNA ("muscle cDNA") was used.

In addition, qRT-PCR according to standard methods was used for the typing. The results for the markers CD73, CD90 and CD105 are shown in FIG. 2. In addition, the pluripotency genes Okt4, SOX2 and Nanog were studied, also by means of qRT-PCR. Suitable primers are shown in Table 1.

Example 5: Tests for Differentiation Capacity

In order to test whether the UC-MSC can in principle be differentiated into muscle cells and fat cells, on day 6 of culturing, the cells obtained were enzymatically detached and sown into 6 wells (2 wells per culture) of a 24-well Primaria plate. After 13 days in culture, the wells were almost confluently grown over and the cell count had increased from $1.9 \times 10^3$ to $3.4 \times 10^3$. In order to test the differentiation capacity (multipotency), a portion of the cells was placed in culture media which promote differentiation into fat cells or muscle cells respectively.

Figure 3:
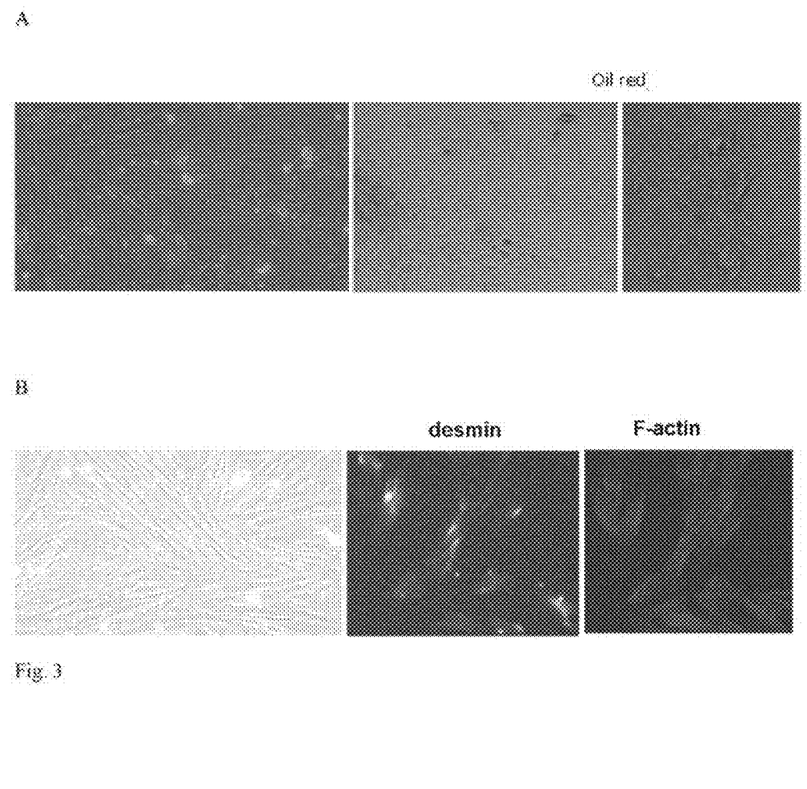
FIG. 3: UC-MSC from the umbilical cord of newborn piglets differentiate into fat cells (A) and muscle cells (B).

The adipogenic differentiation was induced by culturing in DMEM/F12 medium with 10% FBS, 2% glutamine, supplemented with 1 mM dexamethasone, 500 µM IBMX (3-isobutyl methylxanthine), 100 µM troglitazone and 1 µM/ml insulin for the duration of 48 hrs. After this, the induction medium was replaced by differentiation medium (DMEM/F12 medium with 10% FBS, 2% glutamine, 1 µM/ml insulin). After 3 days, the first fat droplets were visible and after 5 days the cells were fixed and stained with the dye Oil red for the fat determination (FIG. 3A).

The myogenic differentiation was triggered by culturing in DMEM with 4.5 g/l glucose (high glucose concentration) with 2% instead of 10% FBS. After 4 days, the cells were fixed and the differentiation determined by means of fluorescence-labeled antibodies against the muscle proteins desmin and F-actin, respectively (FIG. 3B).

The results of these experiments show that the isolated precursor cells are capable of myogenic and adipogenic differentiation.

Example 6: Optimization of the Myogenic Differentiation

The known methods for myogenic differentiation use serum-containing culture media and are characterized by often low efficiency. The purpose was therefore to achieve high efficiency of the differentiation with exclusive use of natural, physiological processes, i.e. without chemical or genetic manipulation.

For the induction of the differentiation, methionine-reduced or methionine-free medium was used, which, without wishing to be bound to theoretical considerations, probably leads to the expression of myogenic genes (MyoD and MyoG) via a DNA demethylation.

Figure 4:
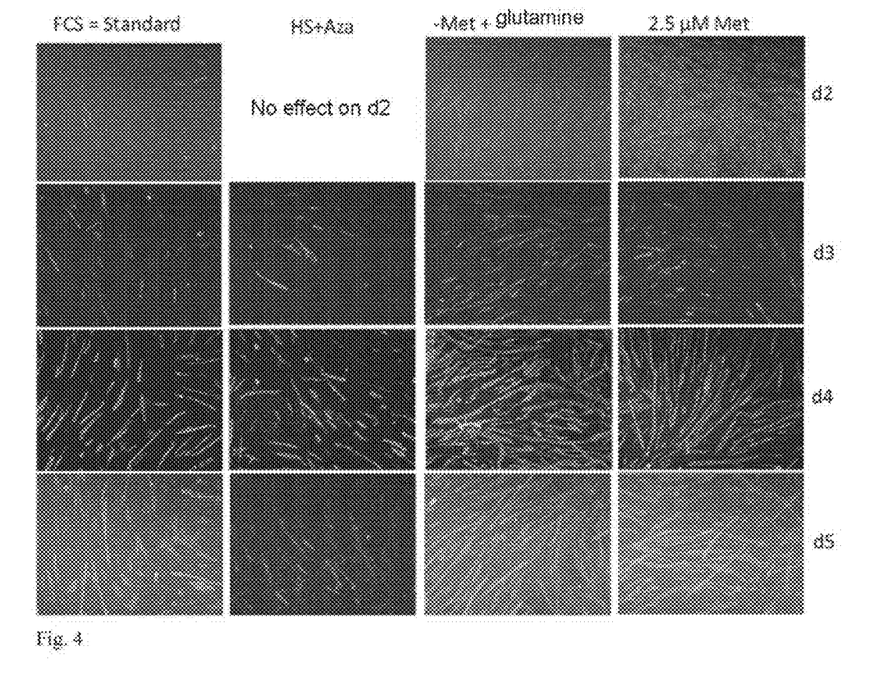
FIG. 4: Variation of the myogenic differentiation of C2C12 murine cells over time in different media, staining with an antibody against myosin (MF 20) on days 2 to 5 after introduction into the respective medium (d2-d5).

In the differentiation experiments, the following media were used:
- "FCS": DMEM high glucose, 2% FCS (fetal calf serum), 0.1% P/S (penicillin/streptomycin)
- "HS": DMEM high glucose, 10% HS (horse serum), 0.1% P/S
- "HS+AZA": DMEM high glucose, 5% HS, 0.1% P/S, 10 µM azacytidine
- "−Met+Glu": DMEM high glucose −MQC (DMEM high glucose without methionine, glutamine, cystine, Gibco, 21013-024), 5% HS, 0.1% P/S, 4 mM L-glutamine
- "2.5 µM Met": DMEM high glucose −MQC, 5% HS, 0.1% P/S, 2 mM L-glutamine, 2.5 µM L-methionine
- "5 µM Met": DMEM high glucose −MQC, 5% HS, 0.1% P/S, 2 mM L-glutamine, 5 µM L-methionine The cell line used was the murine cell line C2C12. The results are shown in FIG. 4, in which comparatively the standard medium (with reduced serum concentration=FCS), the chemical induction (medium with 10 µM 5-azacytidine=HS+AZA), and media without methionine (but supplemented with 4 mM glutamine=−Met+Glu) or with reduced methionine concentration (2.5 µM supplemented with 2 mM glutamine=2.5 µM Met) are compared, respectively. It was also tested whether it is more favorable to discontinue the differentiation medium after 48 hours.

Since no optimizing effect occurred, the differentiation medium was left in the preparation for 5 days.

For the determination of the myogenic differentiation, antibodies against the muscle protein desmin (mouse anti-desmin, clone D-33, DAKO) and one antibody against myosin (MF 20, anti-sarcomere (MHC), in-house production with hybridoma cultures provided by Dr Julia v. Maltzahn, Leibnitz Institute on Ageing, Jena) were used. FIG. 4 shows stainings with MF 20, since the expression of sarcomere myosin is particularly relevant for differentiation success.

The variation in time of the different batches (FIG. 4) clearly shows that the medium developed by us even shows a greater differentiation success than the standard medium.

The differentiation begins sooner, the muscle fibers lie more densely and they appear visually thicker.

The methods with methionine-free or with methionine-reduced media, respectively, give significantly better results than the standard method (reduction of FCS) or the chemical method, and this already in normal 2D culture. In particular, the fusion rate is higher (see also: more cell nuclei in myotubes), the myotubes are bigger and occupy a greater total area. Table 2 shows corresponding measurement results on day 4.

Differentiation Protocol: Gravitation

1. Preparation of a Suspension Culture

Wash C2C12 cells (80% confluent) 2× with PBS

Briefly rinse with trypsin-EDTA solution (0.25% trypsin, 0.53 mM EDTA), to remove medium/FCS residues.

Add 2-3 ml of the trypsin-EDTA solution (0.25% trypsin, 0.53 mM EDTA) to the dish (10 cm) and observe under the microscope when the cells are detached (about 5-15 min at room temperature).

If the cells detach with difficulty: incubate at 37° C.

Add fresh, complete (with FCS) growth medium (6-8 ml), carefully resuspend cells Transfer cells into 15 ml tubes Add 40 µl of a 10 mg/ml DNAse stock solution and incubate 5 mins at RT Briefly vortex and then centrifuge down (200×G, 5 mins)

Remove and discard supernatant, wash cells 2× with 1 ml of growth medium

Centrifuge and take up in 2 ml of medium, count and adjust half to (1) $5 \times 10^3$ cells/ml or (2) $2.5 \times 10^3$ cells/ml.

TABLE 2

Quantification of differentiation results (day 4)

|  | FCS | HS + Aza | −met + Glu | 2.5 µm met |
|---|---|---|---|---|
| Cell nuclei*overall | 2020 ± 148$^A$ | 2991 ± 246$^B$ | 2856 ± 148$^B$ | 2870 ± 95$^B$ |
| Cell nuclei in myotubes** | 90 ± 14$^A$ | 136 ± 5$^{A,B}$ | 466 ± 72$^C$ | 427 ± 55$^C$ |
| Cell nuclei content in myotubes (%) = fusion rate | 4 ± 0.5$^A$ | 5 ± 0.4$^{A,B}$ | 16 ± 3$^C$ | 15 ± 2$^C$ |
| Area of myotubes (µm$^2$) | 20 ± 2$^A$ | 16 ± 1$^{A,B}$ | 29 ± 2$^C$ | 34 ± 3$^C$ |
| Number of myotubes | 75 ± 4 | 74 ± 6 | 57 ± 9*** | 86 ± 7 |
| Myotubes total area (%) | 12 ± 1$^A$ | 9 ± 1$^{A,B}$ | 18 ± 1$^C$ | 21 ± 2$^C$ |
| Ø myotube size (µm$^2$) | 0.3 ± 0.03$^A$ | 0.2 ± 0.006$^{A,B}$ | 0.5 ± 0.07$^{C,D}$ | 0.4 ± 0.005$^{A,C,D}$ |

Different capital letters (A-D) mark significant (P < 0.05) differences between the particular differentiation conditions.
*Here: myonuclei;
**myotubes have at least 2 cell nuclei/myonuclei;
***the lower value results from detachment of formed myotubes owing to excessive myotube density in the culture vessel, which is connected with the differentiation process proceeding more rapidly in methionine-free medium.

Figure 5:
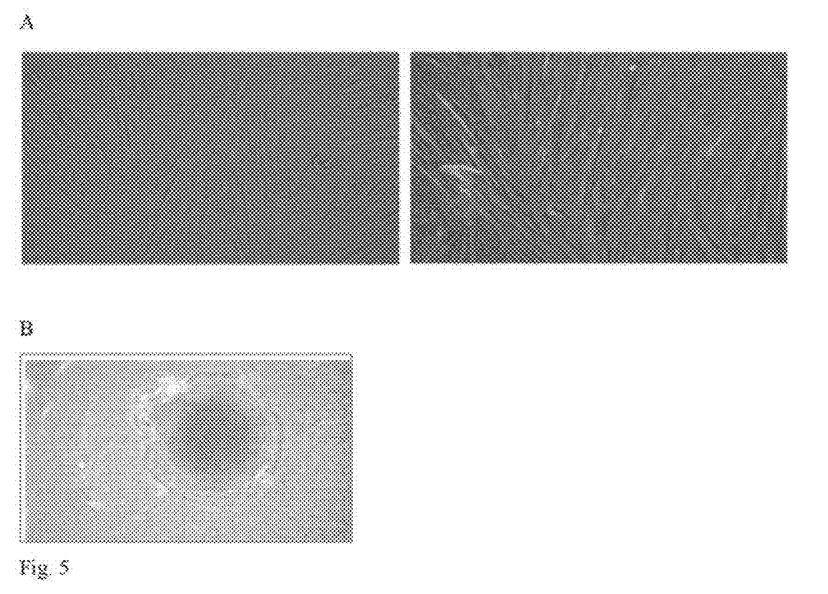
FIG. 5: Myogenic differentiation of UC-MSC in methionine-free medium; (A) transmitted light image of myogenically differentiated cells; (B) spontaneous formation of microtissues.

Differentiation could also be achieved with UC-MSC in methionine-free medium (FIG. 5A). Further, it could be shown that UC-MSC in methionine-free medium already spontaneously form microtissue under the conditions of a conventional 2D culture (FIG. 5B).

Example 7: Culture in "Hanging Drop"

In order to further support the differentiation process, to impart structure and depth, respectively, to the subsequent product, and to achieve a meat-like texture, the new differentiation medium was used in combination with the "hanging drop" culture technique, in order to produce complex, three-dimensional microtissues. These microtissues can be the basis for the production of cell-based meat products. As well as shaped meat (steak- or schnitzel-like), this can also be unshaped meat products (e.g. like minced meat, burger meat) or sausage.

For this, cells were suspended in differentiation medium and then pipetted onto lids of culture vessels which are filled with phosphate-buffered saline. Next, the lids are placed on the vessels, in order to prevent drying out of the cultures. The process was tested again with C2C12 cells in 2 cell densities and with various differentiation media.

2. Establish Hanging Drop Culture

Fill bottom of a 6 cm culture dish with 5 ml PBS

Turn the lid of the culture dish over and pipette 20 µl drops (1, 10,000 cells/drop) or 10 µl drops (2, 25,000 cells/drop) into the lid with a pipette, e.g. at cell density (1) 10×20 µl drops/dish, with cell density (2) 20×10 µl drops/dish Place the lid on the PBS-filled dish and place in the incubator.

Incubate until cell layers or aggregates form, respectively, mostly after 24-72 hrs.

Figure 6:
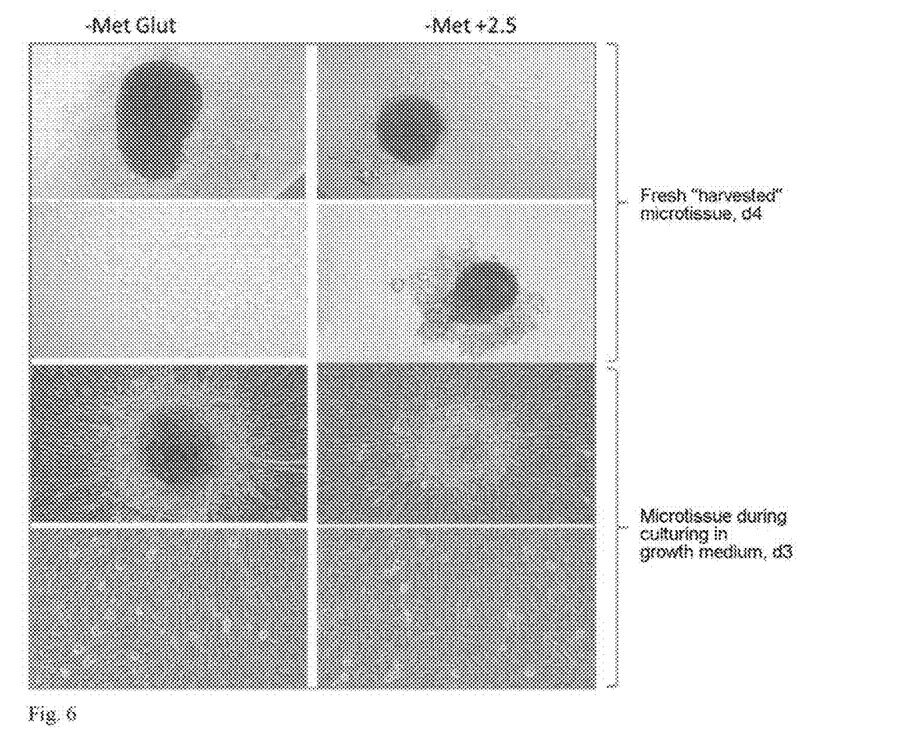
FIG. 6: Myogenically differentiated microtissue produced by the "hanging drop" method (transmitted light image).

The formation of differentiating, 3-dimensional microaggregates takes place within 2-3 days, during which exclusively the aggregation and interaction of the cells (self-organization) owing to gravity and in the case of our novel differentiation medium the naturally triggered demethylation drive the process. Since the cells were stimulated for the formation of their own extracellular matrix structures, no artificial scaffold substances had to be used. Examples of results are shown in FIG. 6.

LITERATURE

AOAC International Official Methods for Analysis 17th Edition, AOAC International, Gaithersburg, MD, 2000

Arutyunyan et al., 2016. Stem Cells Internat Vol 2016, dx.doi.org/10.1155/2016/6901286

Bastian et al. (1985), J Assoc Off Anal Chem 68(5):876-880
Beeravolu et al. (2016). Stem Cell Res 16: 696-711
Cardaso et al. (2012), BMC Biotechnology 12:18; www.biomedcentral.com/1472-6750/12/18
Carlin et al., 2006. Reprod Biol Endocrinol 4: 8; DOI: 10.1186/1477-7827-4-8
Conconi et al., 2006. Int J Mol Med 18:1089-1096
Corotchi et al., 2013. Stem Cell Res Ther 4:81; DOI: 10.1186/scrt232
Hoynowski et al., 2007. Biochem Biophysic Res Comm 362:347-353; DOI:10.1016/j.bbrc.2007.07.182
Ishige et al., 2009, Int J Hematol 90:261-269
Kocaefe et al., 2010. Stem Cell Rev & Rep 6:512-522
Marcus-Sekura et al., 2011. Biologicals 39:359-369.
Moretti et al. 2010, AdvBiochem Engin/Biotechnol 123: 29-54
Pham et al., (2016). Cell Tissue Bank 17: 289-302
Shivakumar et al., 2016. J Cell Biochem 117: 2397-2412.
Simonne et al., (1997), Journal of the Science of Food and Agriculture 73(1):39-45
Stephens et al. 2018. Trends in Food Science & Technology 78: 155-166.
Thorrez & Vandenburgh. 2019. Nat Biotechnol 37: 215-226.
Wang et al, 2004. Stem Cells 22:1330-1337

TABLE 1

Primers for detection of gene expression, all primers are derived from *Sus scrofa* sequences.

| Gene | Sequence (SEQ ID No:) | Product length | Reference Sequence | Comments |
|---|---|---|---|---|
| NTSE (CD73) | fwd: CGTGGCGCGACTTTCTACCA (1)<br>rev: CCAGGGCCATGGCATCGTAA (2) | 167 | XM_001227005.4 | -rev-primer at exon 2-3 transition |
| THY-1 (CD90) | fwd: TCGCTCTCTTGCTAACAGTCTTGC (3)<br>rev: CTGAATGGGCAGGTTGGTGGT (4) | 128 | NM_001146129.1 | -fwd-primer at exon 1-2 transition |
| ENG (CD105) | fwd: TCAGCAACGAGTGGTCGTC (5)<br>rev: CCACGTCAGGCCCCAGATTC (6) | 243 | NM_214031.1 | -fwd-primer at exon 9-10 transition, rev-primer in exon 12 |
| Nanog | fwd: TCGACACCGAGACTGTCTCTCC (7)<br>rev: ACAGAGCTGGGTCTGCGAGA (8) | 188 | ENSSSCT 00000062427.1 | -fwd-primer at exon 1-2 transition |
| POU5F1 (Oct-4) | fwd: CCCGCCCTATGACTTCTGCG (9)<br>rev: CTGGGACTCCTCGGGGTTCG (10) | 220 | NM_001113060.1 | -rev-primer at the exon transition |
| Sox2 | fwd: CAGTGGTCAAGTCCGAGGCG (11)<br>rev: TGTACCGTTGATGGCCGTGC (12) | 209 | NM 001123197.1 | -only one exon known, no exon-spanning primer |
| CD14 | fwd: TGCCAAATAGACGACGAAGA (13)<br>rev: ACGACACATTACGGAGTCTGA (14) | 385 | NM_001097445.2 | -no exon-spanning last 3 bases of exon one are CDS' start primer available since codon |
| CD34 | fwd: TGAAACCTCACTGCCTGCTGC (15)<br>rev: AGGGTCTTCGCCCAGCCTTTCT (16) | 272 | NM_214086.1 | -fwd primer is exon-spanning, primer pair also covers two introns |

The invention claimed is:

1. A method for producing a composition which comprises animal protein, comprising:
   (a) isolating precursor cells from perinatal tissue of an agricultural animal;
   (b) incubating the precursor cells under conditions which lead to a myogenic differentiation of the precursor cells, wherein the conditions which lead to a myogenic differentiation comprise incubation in a culture medium which has a content of methionine of at most 5 μM; and
   (c) harvesting the cells.

2. The method of claim 1, wherein the precursor cells are multipotent precursor cells.

3. The method of claim 1, wherein the culture medium is a serum-free culture medium.

4. The method of claim 1, wherein the reduced content of methionine is at most 4 μM.

5. The method of claim 1, wherein during the myogenic differentiation contact of the precursor cells with a solid surface is avoided, whereby microtissues of myogenically differentiated precursor cells are produced.

6. The method of claim 1, wherein step (a) comprises the following steps:
   (i) providing at least one perinatal tissue of a mammal;
   (ii) comminuting the perinatal tissue, so that pieces thereof are obtained;
   (iii) incubating the pieces of the perinatal tissue in a culture medium;
   (iv) whereby precursor cells are obtained.

7. The method of claim 6, wherein the culture medium in step (iii) is a culture medium which is free from serum of an agricultural animal.

8. The method of claim 1, wherein the perinatal tissue comprises tissue from an umbilical cord.

9. The method of claim 1, wherein the agricultural animal is from the family Suidae.

10. The method of claim 2, wherein the multipotent precursor cells comprise mesenchymal stem cells.

11. The method of claim 3, wherein the serum-free culture medium comprises a proportion of conditioned serum-free medium.

12. The method of claim 4, wherein the content of methionine is selected from at most 3 μM, at most 2.5 μM, or 0 μM.

13. The method of claim 7, wherein the culture medium is a serum-free medium.

14. The method of claim of claim 1, wherein the content of methionine is at most 2.5 μM.

15. The method of claim 1, wherein the culture medium is without added methionine or has 0 μM methionine.

16. The method of claim 1, wherein the agricultural animal is from the genus *Sus*.

17. The method of claim 1, wherein the agricultural animal is from the species *Sus scrof*.

* * * * *